US010832589B1

(12) United States Patent
Anzalone et al.

(10) Patent No.: US 10,832,589 B1
(45) Date of Patent: Nov. 10, 2020

(54) SYSTEMS AND METHODS FOR PAST AND FUTURE AVATARS

(71) Applicant: Wells Fargo Bank, N.A., San Francisco, CA (US)

(72) Inventors: Marjorie S. Anzalone, San Francisco, CA (US); Darius A. Miranda, San Francisco, CA (US); Warinola Marria Rhodriquez, San Francisco, CA (US); Samundra Timilsina, South San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/156,746

(22) Filed: Oct. 10, 2018

(51) Int. Cl.
*G09B 19/00* (2006.01)
*G06Q 40/02* (2012.01)
*G06F 3/0482* (2013.01)
*G06F 3/0484* (2013.01)
*G06F 3/14* (2006.01)

(52) U.S. Cl.
CPC .......... *G09B 19/00* (2013.01); *G06F 3/0482* (2013.01); *G06F 3/04845* (2013.01); *G06F 3/04847* (2013.01); *G06Q 40/02* (2013.01); *G06F 3/1423* (2013.01); *G06F 2203/04803* (2013.01)

(58) Field of Classification Search
CPC ... G09B 19/00; G06F 3/0482; G06F 3/04845; G06F 3/04847; G06F 3/1423; G06F 2203/04803; G06Q 40/02
See application file for complete search history.

(56) References Cited

U.S. PATENT DOCUMENTS

| 6,856,427 | B1 * | 2/2005 | Gilman | H04N 1/6011 |
| | | | | 358/1.9 |
| 9,101,261 | B2 | 8/2015 | Kim et al. | |
| 9,338,622 | B2 | 5/2016 | Bjontegard | |
| 9,761,055 | B2 | 9/2017 | Miller | |
| 2005/0162419 | A1 | 7/2005 | Kim et al. | |
| 2006/0158385 | A1 * | 7/2006 | Etelapera | G06F 3/1438 |
| | | | | 345/31 |

(Continued)

OTHER PUBLICATIONS

Hershfield et al., "Increasing saving behavior through age-progressed renderings of the future self", http://www.dangoldstein.com/papers/Hershfield_Goldstein_et_al_Increasing_Saving_Behavior_Age_Progressed_Renderings_Future_Self.pdf, Nov. 2011. 15 pages.

(Continued)

*Primary Examiner* — Stella Higgs
(74) *Attorney, Agent, or Firm* — Foley & Lardner LLP

(57) ABSTRACT

An advisor system creates an advisor panel to advise a user with regards to any number of topics, such as, e.g., a financial questions or concerns the user may have. The panel is composed of one or more advisor avatars that are generated based on one or more traits of the user. The avatars may include past, present and/or future versions of the user. Various devices are utilized to display the panel to the user and allow the user to engage the panel. The system may adapt the advice provided by the panel, the features of the avatars and/or the manner in which the avatars interact with the user and/or each other in response to trends noted by the advisor system as the system is used by the user as well as others.

28 Claims, 4 Drawing Sheets

(56) References Cited

U.S. PATENT DOCUMENTS

| | | | |
|---|---|---|---|
| 2009/0059175 A1* | 3/2009 | Le Quesne | G06F 3/042 |
| | | | 353/28 |
| 2011/0029889 A1 | 2/2011 | Karstens | |
| 2012/0254749 A1* | 10/2012 | Downs, III | G06Q 50/22 |
| | | | 715/706 |
| 2013/0257877 A1 | 10/2013 | Davis | |
| 2013/0325493 A1 | 12/2013 | Wong et al. | |
| 2015/0185996 A1* | 7/2015 | Brown | G06F 3/04817 |
| | | | 715/706 |
| 2016/0086500 A1* | 3/2016 | Kaleal, III | G06T 19/00 |
| | | | 434/257 |
| 2017/0080346 A1 | 3/2017 | Abbas | |
| 2017/0103432 A1 | 4/2017 | Borchetta et al. | |
| 2017/0113140 A1 | 4/2017 | Blackstock et al. | |
| 2019/0205727 A1* | 7/2019 | Lin | G06K 9/6262 |

OTHER PUBLICATIONS

Zweig, Jason, "Meet 'Future You' Like What You See?", https://www.wsj.com/articles/SB10001424052748703410604576216663758990104, Mar. 26, 2011. 5 pages.

* cited by examiner

SYSTEMS AND METHODS FOR PAST AND FUTURE AVATARS

BACKGROUND

Individuals often rely on outside sources for advice (e.g. information, guidance, suggestions, assistance, etc.) when making decisions, trying to accomplish a personal change, achieve a goal, etc. However, despite seeking out such outside help, individuals do not always accept or follow the advice that they receive. This failure of an individual to act on the advice received from an outside source may be based on any number of causes or reasons. Often times, an individual may make an active, conscious decision not to follow the advice, e.g. as a result of the content and/or nature of the advice and/or the source of the advice. In some situations, the advice may no longer be of relevance to the user.

However, the failure of an individual to follow advice is not always intentional and may instead be caused by any number factors that prevent the individual from acting on the advice. In some situations, such as when seeking specialized forms of advice, such as, e.g. financial advice, the timing, accessibility and/or cost associated with seeking out and meeting with an advisor may prevent an individual from even being able to receive the needed advice, let alone be in a position to heed the advice.

In other situations, a user may fail to follow the advice provided by others for subconscious reasons. For example, when receiving advice from a stranger, an individual may unconsciously ignore some of the advice provided by the individual as a result of the individual's unfamiliarity with the person with whom they are interacting. Also, if the individual is unable to relate to the person providing the advice and/or the advice itself, the individual may subconsciously fail to internalize the provided advice, which may limit that likelihood that the individual will follow the provided advice.

SUMMARY

In some implementations of the present disclosure, a method and system of providing advice to a user using a provider computing device includes obtaining personal information related to a user; analyzing the personal information to identify one or more traits of the user; creating a first advisor avatar, wherein at least one trait defining the first advisor avatar is based on at least one of the traits of the user; identifying a financial goal of the user; identifying one or more tasks related to the identified financial goal; displaying, via a display of a display device, the first advisor avatar; and communicating, using the first advisor avatar displayed by the display device, the one or more tasks related to a user.

According to some arrangements, the at least one trait of the avatar is determined based on an association between the at least one trait of the first advisor avatar and at least one user traits stored in a database of the provider computing device. The one or more personal traits of the user are obtained by the provider computing device from a source of user personal information that has been obtained through monitored usage of a computing device by the user. The at least one advisor avatar trait is based on a current visual appearance of the user. A visual appearance of the advisor avatar is defined by an age progression modified version of the current visual appearance of the user. A second advisor avatar is created and displayed via the display device, wherein a visual appearance of the second avatar is defined by a prior visual appearance of the user, the prior visual appearance of the user being visually distinct from a current visual appearance of the user. Prior to or concurrent with communicating the one or more tasks using the first advisor avatar, the second advisor avatar communicates with the first avatar using the display device. One or more expected user behaviors are associate with the one or more tasks, and subsequent to communicating the one or more tasks, the behavior of the user is monitored to determine whether the one or more tasks have been completed.

BRIEF DESCRIPTION OF THE DRAWINGS

The above and other aspects and features of the present disclosure will become more apparent to those skilled in the art from the following detailed description of the example arrangements with reference to the accompanying drawings, in which.

DETAILED DESCRIPTION

Figure 1:
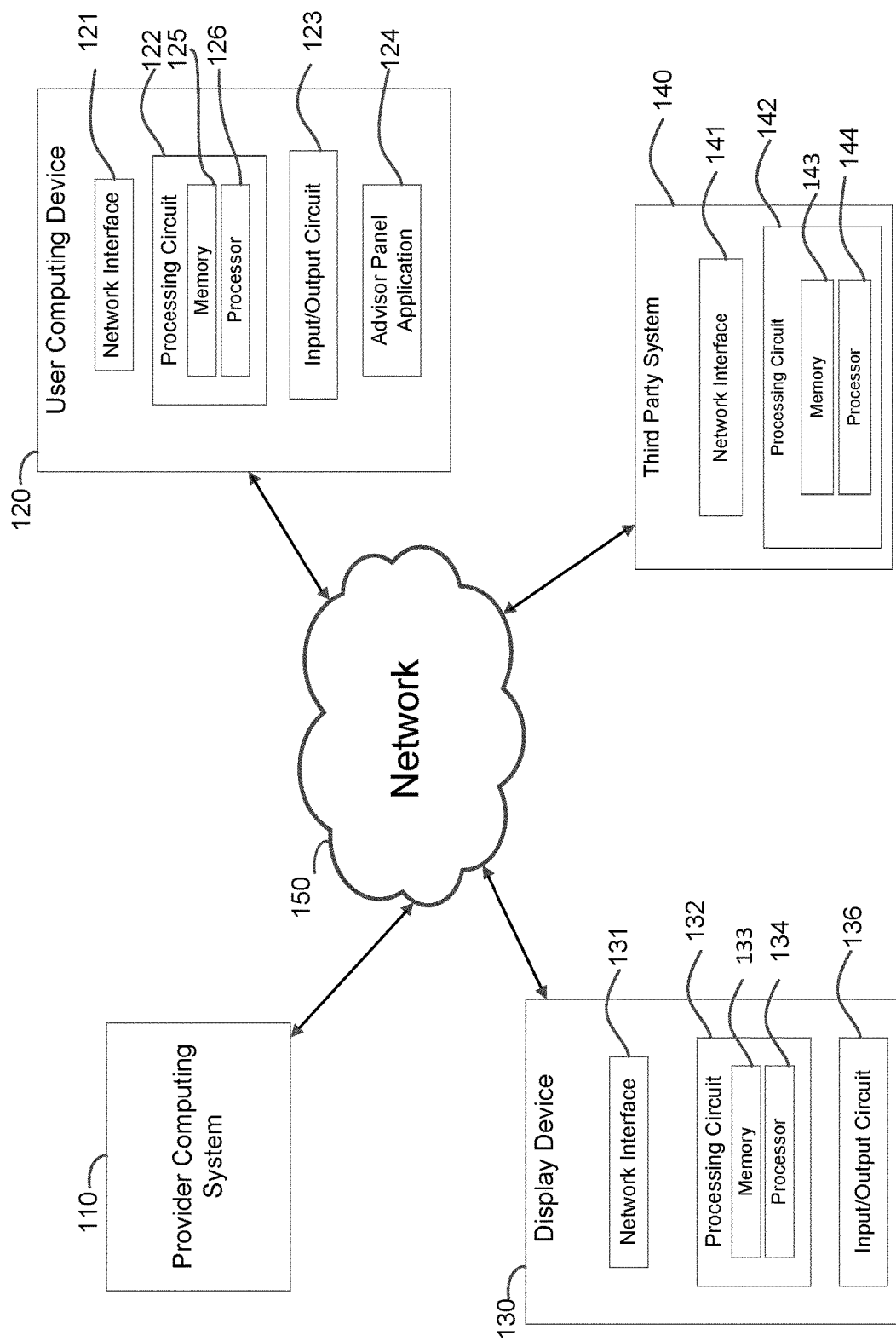
FIG. 1 is a diagram of a system for providing an advisor panel according to an example embodiment.

The likelihood of a user asking for information, following advice, and/or being receptive to assistance is often dependent on the ability of a user to trust, connect with, be engaged by and/or relate to the source of the information, advice, or assistance being given. Accordingly, it would be desirable to provide an advisor panel system configured to advise and optionally coach a user in which one or more advisors forming the panel are based on past, present and/or future versions of the user.

By composing the advisor panel of avatars based on the user, the advisor panel system increases the relatability of the advisor panel to the user, thereby minimizing or avoiding the risk of a user consciously or subconsciously ignoring or otherwise failing to utilize and/or heed advice and/or assistance as a result of issues such as, e.g., mistrust, apprehension, doubt, personality differences, or any other number of factors. Also, the interaction of the user with an advisor panel comprised of avatars based on past, present and/or future provides a personalized user experience, which may facilitate the ability of a user to understand and appreciate the relevance, context, implications of, importance, or other significance of the advice and/or assistance being provided, which in turn increases the likelihood that the user will internalize and act on the advice and assistance being provided.

Referring generally to FIGS. 1-4, systems and methods for providing an advisor panel according to various arrangements are shown. In general, the advisor panel system is configured to receive information related to a user, such as, e.g., a financial situation of the user. Based on this information, the advisor panel is configured to provide information, answer questions, provide advice, or otherwise engage a user (hereinafter collectively referred to as "advise" the user). The advisor panel may be configured to advise a user on any number of various topics, such as, e.g. the user's financial situation. The scope of the suggestions, information, tips, help, feedback or other advice (hereinafter collectively referred to as "advice") provided by the advisor panel may range from targeted advice (e.g. an answer to a specific question the user may have related to his/her finances), to broad and open-ended advice (e.g. suggestions related to overall financial health). According to some arrangements, the advisor panel system optionally is configured to develop a plan related to the advice provided by the advisor panel system. In some such arrangements, the advisor panel additionally is configured to coach the user towards realizing the developed plan.

The advisor panel created by the advisor panel system comprises one or more computer-generated advisors characterized by features that are specific to the user. According to various arrangements, the advisor avatars are based on past, present and/or future versions of the user. In some arrangements, past and/or future versions of the user are created by augmenting an obtained or captured present image of the user. By basing the advisor avatars on the user, the advisor panel solves a technical problem where conscious or unconscious biases that may otherwise affect the ability of a user to actualize or otherwise benefit from advice provided by a seemingly impersonal computer system is decreased. Additionally, by basing the advisor avatars on the user, relatability of the advice to the user is increased, thus also increasing the likelihood that the user will internalize and act on the received advice. Moreover, the visualization of various avatars based on oneself may provide a user with additional motivation to follow the advice provided by the advisor panel.

Once the advisor panel has been created, the advisor panel system utilizes that advisor panel to provide advice and optional coaching to the user in a manner that has been determined to be most effective for relaying information to the user. Thus, using the advisor panel systems and methods employed herein, the likelihood that a user will act on/utilize the advice or assistance that is provided to him/her is increased.

As shown in FIG. 1, according to one arrangement, the advisor panel system 100 includes a provider computing system 110, a user computing device 120, a display device 130, and a third-party system 140. The various components of the advisor panel system 100 are configured to communicate with each other over a network 150. The network 150 is a data exchange medium, which includes wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 150 includes the internet.

The provider computing system 110 is a computing system at a provider configured to create an advisor panel intended to advise (i.e. provide information, guidance, tips, suggestions, feedback, etc. or otherwise engage or interact with) a user regarding any number of different topics. In some arrangements, the advisor panel is additionally (or alternatively) configured to provide any number of different forms and types of assistance to a user, such as, e.g. developing a task list/action plan based on the provided advice; coaching the user towards completing the identified tasks/implementing the developed plan and/or other tasks/plans; coaching the user towards accomplishing the one or more identified goals and/or other goals; providing the user with reminders and/or updates; etc. According to various arrangements, the provider computing system 110 is adapted to provide additional services in addition to the creation of an advisor panel.

According to some arrangements, the provider computing system 110 is operated by a provider of financial services, such as, e.g. a bank, credit union, investment brokerage, or any other organization, institution or system that provides financial services, with the advice offered (and optional assistance provided) by the advisor panel system 100 being related to any number of different financial topics and issues.

The provider computing system 110 is configured to present to the user via the user computing device 120 and/or display device 130 communications from a user-specific advisor panel. In some arrangements, the provider computing system 110 is configured to receive information related to the user from the user computing device 120 and/or third-party system 140 over the network 150 in order to customize, tailor, or otherwise make the communications presented to the user more user-specific.

The user computing device 120 is a computing system associated with a user and may include any number of wearable and non-wearable devices. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. User computing device 120 may also include any type of mobile device including, but not limited to, a phone (e.g., smart phone, etc.) and a computing device (e.g., desktop computer, laptop computer, personal digital assistant, etc.).

As shown in FIG. 1, user computing device 120 generally comprises a network interface 121, a processing circuit 122, and an input/output circuit 123. Network interface 121 includes program logic that facilitates connection of the user computing device 120 to the network 150. Accordingly, the network interface 121 supports communication via network 150 between the user computing device 120, the provider computing system 110, display device 130, and third-party system 140. The network interface 121 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 121 includes cryptography capabilities to establish a secure or relatively secure communication session.

The processing circuit 122 is configured to at least partly control the user computing device 120 as described herein. The processing circuit 122 includes one or more memory devices 125 and processor 126. The processor 126 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 125 (e.g., RAM, ROM, NVRAM, Flash Memory, hard disk storage, etc.) may store data and/or computer code for facilitating at least some of the various processes described herein. In this regard, the one or more memory devices 125 may store programming logic that, when executed by the processor 126, controls the operation of the user computing device 120.

The input/output circuit 123 is structured to receive from and provide communication(s) to a user of the user computing device 120. The input/output circuit 123 includes one or more input/output components that interface with a user (e.g., screens, speakers, microphones, remotes, buttons, touchscreens, vibration mechanisms) as well as any combination of hardware components, communication circuitry, and machine-readable media for facilitating the exchange of information between the input/output components and elements of the user computing device 120, including the processing circuit 122 and the network interface 121. For example, in an embodiment where the user computing device 120 is a smartphone or a tablet, the input/output components may include a touch screen, one or more speakers, one or more microphones, one or more cameras, and/or a fingerprint reader. In an embodiment where the user computing device 120 is a television, the input/output components may include a television display (e.g., liquid-crystal-display, plasma display, light-emitting-diode display), one or more speakers, and a remote control with buttons that can be pressed by a user. In an embodiment where the user computing device 120 is a smart watch, the input/output components may include a screen, a speaker, a vibration generator, and a touch-sensitive bezel, screen, and/or buttons. The input/output circuit 123 thereby facilitates two-way transfer of information between a user and a user computing device 120. As will be understood, according to various embodiments, the display device 130 may comprise the output component(s) of the input/output components of the user computing device 120.

As noted above, according to various arrangements the user computing device 120 may be defined by any number of different devices. Additionally, according to various arrangements, the user computing device 120 may comprise a plurality of the same or different devices. In some such arrangements, some or all of the multiple devices defining the user computing device 120 are used simultaneously to receive information from the other component(s) of the advisor panel system 100 (e.g., in some arrangements communications from the provider computing system 110 are simultaneously transmitted to each of the user computing devices 120). Alternatively, or additionally, in some arrangements, information/communication from other components of the advisor panel system 100 are selectively transmitted to only some of the specific individual devices defining the user computing device 120. For example, in some arrangements certain types of communications are sent exclusively to a particular type of device (e.g. a smartwatch) defining the user computing device 120, while other types of communications are sent exclusively to another particular type of device (e.g. a smartphone) defining the user computing device 120. In other arrangements, the selection of a particular device is alternatively, or additionally, based on other factors, such as, e.g., the timing of the communication, the content of the communication, the type of device from which the last communication from the user computing device 120 was received, etc. As will be described in more detail below, according to various arrangements, the selection of which of the one or more devices defining the user computing device 120 that communications are transmitted to may be based on information stored in the database 211 that has been acquired by the adaptive circuit 250 over the course of the operation of the advisor panel system 100.

According to various arrangements, the user computing device 120 may include an advisor panel application 124 obtained from the provider computing system 110 via which the user computing device 120 is configured to receive information from and transmit information to the provider computing system 110 related to the advisor panel system 100. The advisor panel application 124 facilitates receiving and displaying communications to and from the advisor panel circuit 200. In some arrangements, the advisor panel application 124 may be used to display the advisor panel to the user.

In some arrangements, the advisor panel application 124 is incorporated with an existing application provided by the provider computing system 110 and stored or otherwise accessible by the user computing device 120. In other arrangements, the advisor panel application 124 may be a separate application provided by the provider computing system 110. The advisor panel application 124 may be downloaded by the user computing device 120 prior to its usage, may be hard coded into the memory of the user computing device 120, or may be a web-based interface application that is executed and maintained remotely, and which is displayed and made accessible to a user via a web browser (or other client interface) of the user computing device 120. In the latter instance, the user may have to log onto or access the web-based interface before usage of the advisor panel application 124. In certain embodiments, the advisor panel application 124 may include an application programming interface (API) and/or a software development kit (SDK) that facilitate the integration of other applications with the advisor panel application 124.

The display device 130 presents the advisor panel to the user. According to various arrangements, the display device 130 is also configured to present to the user optional additional visual, audio, and/or haptic communications related to the operation of the advisor panel system 100. According to various arrangements, the content that is presented to the user via the display device 130 may be received over the network 150 via network interface 131 of the display device 130 from the provider computing system 110, user computing device 120, and/or the third-party system 140. The network interface 131 of the display device 130 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 131 includes cryptography capabilities to establish a secure or relatively secure communication session.

As illustrated in FIG. 1, according to various embodiments, the display device 130 may additionally include a processing circuit 132 including one or more memory devices 133 and a processor 134. The processor 134 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 133 (e.g., RAM, ROM, NVRAM, Flash Memory, hard disk storage, etc.) may store data and/or computer code for facilitating at least some of the various processes described herein. In this regard, the one or more memory devices 133 may store programming logic that, when executed by the processor 134, controls the operation of the display device 130.

As further illustrated in FIG. 1, according to various embodiments, the display device 130 includes an input/output circuit 136 structured to receive communications from the provider computing system 110 and/or user computing device 120, in response to which the display device 130 outputs communication(s) to a user via any one of or any combination of output components of the display device 130, such as, e.g., a screen, speaker, microphone, remote, button, touchscreen, vibration mechanisms, etc.

Figure 2A:
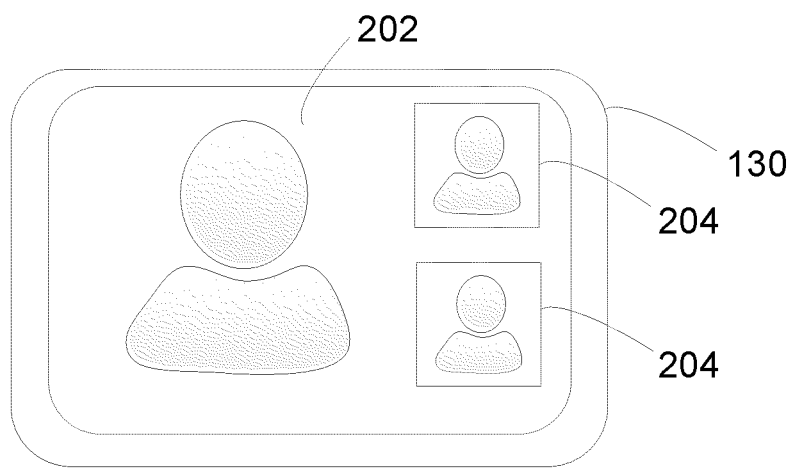
FIGS. 2A-2C illustrate display devices according to example embodiments.
Figure 2B:
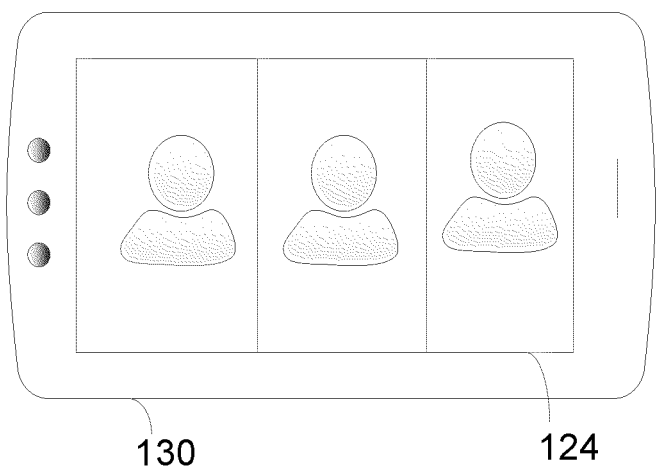
Figure 2C:
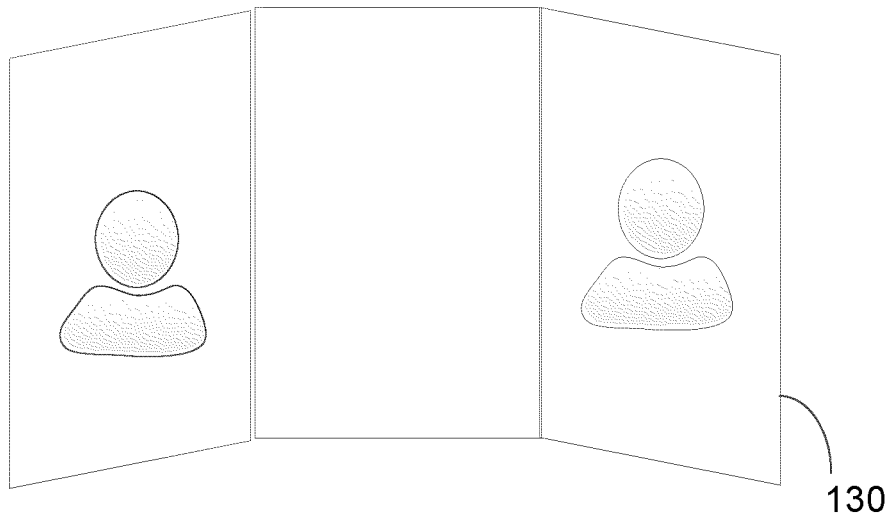

As illustrated in FIGS. 2A-2C, the display device 130 comprises any number of various devices capable of transmitting and receiving visual, audio, and/or haptic communications. According to various arrangements, the display device 130 is defined by all or some components of one or more existing devices such as, e.g. televisions (e.g., such as shown in FIG. 2A); laptop or desktop computing devices, mobile devices; tablets; mirrors; smart-appliances; projectors; digital assistant devices, smartphones (such as, e.g., shown in FIG. 2B); gaming devices; on-board vehicle controllers; etc. In other arrangements, (such as, e.g., when the advisor panel system 100 is provided as a stand-alone system operated by a provider) the display device 130 is defined by specialized hardware designed specifically for operation of the advisor panel system 100. For example, according to some arrangements, the display device 120 may comprise a holograph generator configured to render 2-D or 3-D holographic avatars. In other arrangements, the display device 130 may comprise a specialized augmented and/or virtual reality headset. In some such arrangements, the augmented and/or virtual reality headset is configured to be used in a specific location/setting, with the augmented reality headset configured to display the advisor panel and/or additional content relative to the setting/objects at the specific location to produce a specific user experience, such as, e.g., the user and the advisor panel talking around a conference table, over drinks, on a golf course, etc. In yet other arrangements, such as, e.g. shown in FIG. 2C, the display device 130 comprises a segmented panel configured to display a different advisor within each panel. One or more of the segmented panel surfaces may function as a mirror when not displaying an advisor on the surface of the panel.

In addition to incorporating any number of different components adapted to operate the display device 130 to display the advisor panel according to any of the various methods described herein, according to various arrangements, the display device 130 also optionally includes any number of additional components configured to provide any number of additional features. For example, according to some arrangements, the display device 130 includes a camera/video device that may be used to: authenticate a user; monitor user behavior during operation of the advisor panel system 100 for purposes of obtaining feedback that can be used to tailor the current of future sessions of the advisor panel system 100 and/or to refine the traits of the avatars; record advice sessions; etc. According to some arrangements, the display device 130 additional component includes one or more physiological sensors that monitor one or more user states (e.g., heart rate, blood pressure, eye-movements etc.). As will be understood, according to various arrangements, the additional components described above are integrated into the physical structure of the display device 130; while in other arrangements the additional components are provided as separate, discrete components that are operatively coupled to the display device 130.

The third-party system 140 comprises any number of different devices, programs, networks or systems utilized by the user and from which the provider computing system 110 is able to obtain additional user information and/or monitor user behavior and/or activity to generate a more customized and tailored user-specific advisor panel over the network 150 via a network interface 141 of the third-party system 140. Additionally, or alternatively, in embodiments of the advisor panel system 100 comprising an assistance mode, the third-party system 140 may also comprise any number of different devices, programs, networks or systems capable of being utilized by the advisor panel to assist the user in realizing his/her goal. In arrangements in which the third-party system 140 is used to both supplement the user information available to the advisor panel system 100 and to expand the ways by which the advisor panel system 100 is able to assist the user; the devices, programs, networks and systems used to obtain additional user information can be the same or different as those which are utilized by the advisor panel in the advisor panel assistance mode.

The network interface 141 of the third-party system 140 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the provider network interface 111 includes cryptography capabilities to establish a secure or relatively secure communication session. As illustrated in FIG. 1, according to various embodiments, the third-party system 140 may additionally include a processing circuit 142 including one or more memory devices 143 and a processor 144. The processor 144 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 143 (e.g., RAM, ROM, NVRAM, Flash Memory, hard disk storage, etc.) may store data and/or computer code for facilitating at least some of the various processes described herein. In this regard, the one or more memory devices 143 may store programming logic that, when executed by the processor 144, controls the operation of the third-party system 140.

Non-limiting examples of third-party system 140 include social media sites, smartphone or tablet applications, web-browsers, personal computing and mobile devices, (e.g. smartphones, tablets, portable gaming devices, personal digital assistants, laptops, desktop computers, etc.), cookies, chat sessions, call recordings, user accounts at or other institutions, GPS devices, physiological monitors, televisions and television accessories (e.g., smart televisions, projectors, gaming consoles, DVD/Blu-ray players, digital cable/satellite boxes, media streaming devices), voice assistants, automobile entertainment systems, wearable devices (virtual reality headsets, augmented reality headsets, smart watches, fitness trackers); etc.

Although the provider computing system 110, the user computing device 120, the display device 130 and the third-party system 140 have each been described as being discrete, standalone components of the advisor panel system 100, it is to be understood that any combination of one or more of these components may be incorporated into a single, multi-function device/system. For example, according to various arrangements, a smartphone of a user functions as the user computing device 120, the display device 130 and the third-party system 140 of the advisor panel system 100. Additionally, while the advisor panel system 100 has been described as including a single provider computing system 110, a single user computing device 120, a single display device 130 and a single third-party system 140, it is to be understood that the advisor panel system 100 may include one or more of the same of differing versions of any of these components.

Figure 3:
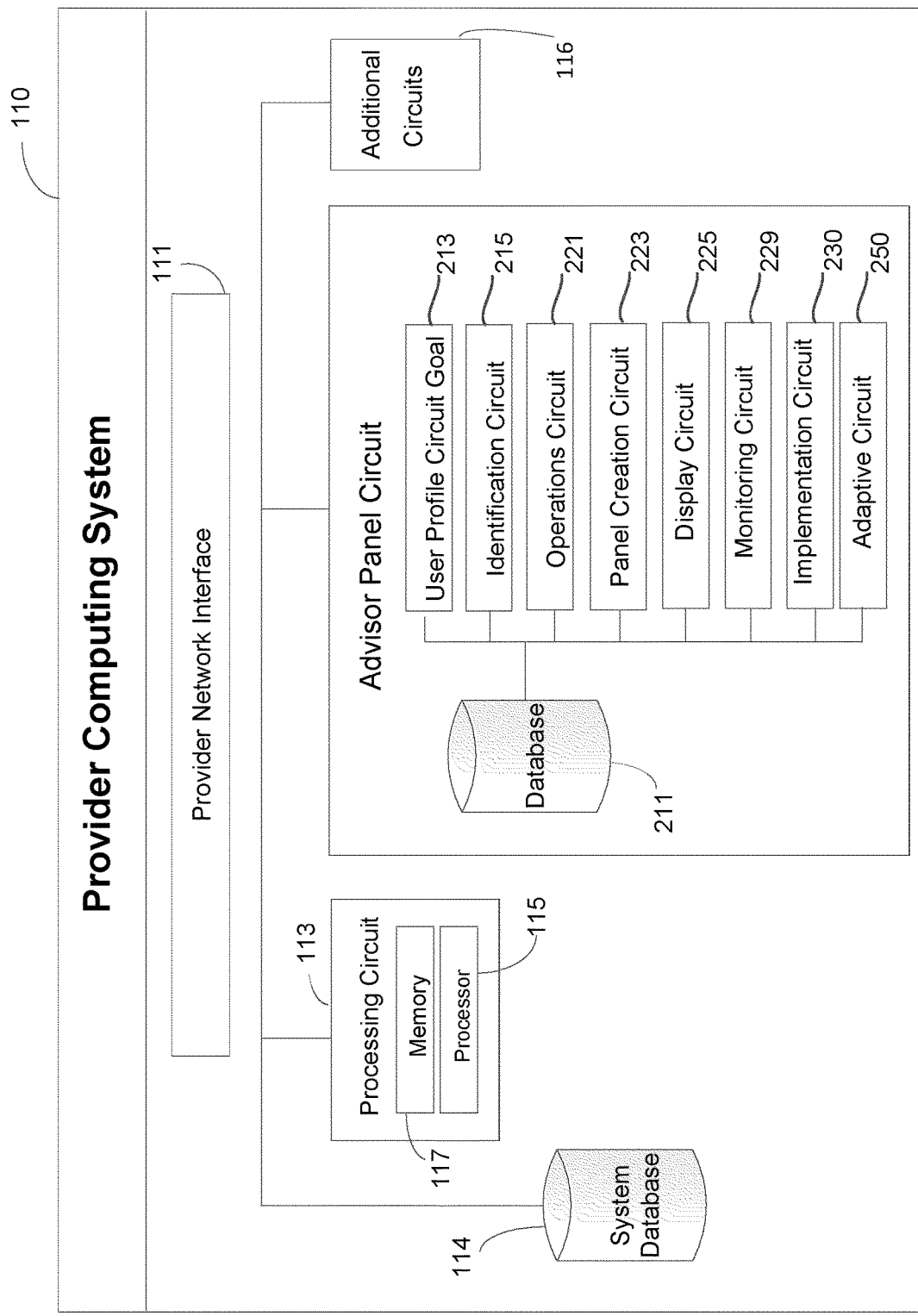
FIG. 3 is a diagram of the provider computing system set forth in FIG. 1 according to an example embodiment.

Referring to FIG. 3, a more detailed representation of the components of the provider computing system 110 is provided. As noted above, according to some arrangements, the provider computing system 110 is a computing system associated with a financial institution configured to create an advisor panel with which to advise a user with regards to one or more financial topics, and to optionally coach the user towards accomplishing one or more financial goals. In such arrangements, the user may or may not have a financial account at the financial institution associated with the provider computing system 110.

The provider computing system 110 includes a processing circuit 113, which may further include a processor 115, and one or more memory devices 117. The processor 115 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 117 (e.g., RAM, NVRAM, ROM, Flash Memory, hard disk storage, etc.) store data and/or computer code for facilitating the various processes described herein, and may be or include tangible, non-transient volatile memory or non-volatile memory. Accordingly, the one or more memory devices 117 may include database components, object code components, script components, or any other type of information structure for supporting the various activities and information structures described herein. For example, the processor 115 and one or more memory device 117 are configured to enable the provider computing system 110 to exchange data over the network 150, execute software applications, access websites, generate graphical user interfaces, and perform other operations. According to various arrangements, the processing circuit 113 of the provider computing system 110 is configured to store and provide the advisor panel application 124 via which a user computing device 120 communicates information related to the advisor panel circuit 200 with the provider computing system 110.

According to various arrangements, the provider computing system 110 also includes a provider network interface 111 enabling the provider computing system 110 to exchange data over the network 150, an advisor panel circuit 200, and a system database 114. As shown in FIG. 2, according to various arrangements, the provider computing system 110 also optionally includes one or more additional circuits 116 configured to provide any number of additional services (e.g. mobile banking) that are offered by the provider.

The provider network interface 111 includes program logic that facilitates connection of the provider computing system 110 to the network 150. The provider network interface 111 supports communication between the provider computing system 110 and other systems, such as the user computing device 120, display device 130 and third-party system 140. According to various arrangements, the provider network interface 111 includes a cellular transceiver (e.g., Code Division Multiple Access (CDMA), Global System for Mobile Communications (GSM), Long-Term Evolution (LTE), etc.), a wireless network transceiver (e.g., 802.11X, ZigBee, Bluetooth, etc.), a radio-frequency identification (RFID) transceiver, and a near-field communication (NFC) transmitter, or any combination thereof (e.g., both a cellular transceiver and a Bluetooth transceiver). In some arrangements, the provider network interface 111 includes hardware and machine-readable media sufficient to support communication over multiple channels of data communication. Further, in some arrangements, provider network interface 111 includes cryptography capabilities to establish a secure or relatively secure communication sessions with the other systems of the advisor panel system 100, such as the user computing device 120, display device 130 and third-party system 140. In this regard, data (including, e.g., financial data) may be encrypted and transmitted to prevent or substantially prevent the threat of hacking.

The system database 114 allows the provider computing system 110 to retrievably store user information relating to the various operations discussed herein, and includes non-transient data storage mediums (e.g., local disc or flash based hard drives, local network servers, and the like) or remote data storage (e.g., cloud servers). The system database 114 includes information such as, but not limited to: personal user information (e.g., names, addresses, phone numbers, etc.), identification information (e.g., driver's license numbers, standard biometric data, etc.), user financial information (e.g., token information, account numbers, account balances, available credit, credit history, transaction histories, assets, etc.), user preferences, user goal(s)/plans, user profiles (e.g. social media presence, browsing histories, spending habits, etc.), etc.

The information stored in the system database 114 is obtained from any number of different sources. For example, any information and/or data obtained or created during use of the advisor panel system 100 is saved to the system database 114. Additionally, in arrangements in which the user has or had an account with the provider associated with the provider computing system 110, the information stored in the system database 114 includes information originating with reference to the previously opened accounts with the provider. For example, in arrangements in which the provider is a financial institution, the additional accounts may include, e.g., a checking account, home loan, etc. In some arrangements, the information stored in the system database 114 also includes information and data obtained from uses of the user computing device 120 and/or third-party system 140 with provider computing system 110 unrelated to the advisor panel system 100. According to various arrangements, the information stored in the system database 114 includes both information and data obtained directly and indirectly from the user.

The advisor panel system 100 can be configured to provide customized and tailored advice, and optionally assistance, to a user related to any number of different topics, issues, questions, decisions, concerns, etc. a user may have, irrespective of how specific (e.g. choosing an appropriate lending product) or how general (overall financial health planning) the scope of the user request may be. The advice provided by the advisor panel system 100 may be provided: in direct reference to specific question(s)/issue(s) asked or raised by the user; based on user responses to guided questions/requests for information from the advisor panel; as general help, tips or suggestions, etc. related to a selected topic; etc. Because individuals respond differently to various types of advice and assistance, in some arrangements, the advisor panel system 100 is adapted to utilize different approaches, personas, strategies, etc. in providing advice to a user, depending on the personality and traits of the user that is using the advisor panel system 100.

As noted above, in addition to defining an "advice mode" in which the advisor panel is configured to advise a user, the advisor panel system 100 also includes an optional "assistance mode" in which the advisor panel is configured to inform, guide, encourage, or provide any number of different forms and types of assistance to a user, such as, e.g. developing a task list/action plan based on the provided advice; coaching the user towards completing the identified tasks/implementing the developed plan and/or other tasks/plans; identifying one or more user goals; coaching the user towards accomplishing the one or more identified goals and/or other goals; providing the user with reminders and/or updates; etc.

In some arrangements in which the advisor panel system 100 includes an assistance mode, the assistance provided by the advisor panel system 100 is used to assist a user in with regards to any number or types of different financial issues or topics, including specific issues (e.g. purchasing a new car, paying for a wedding, going on a vacation, etc.), to general (e.g. retirement, setting up a college fund, etc.) to a broad goal of overall financial health. In some such arrangements, the advisor panel system 100 is configured to assist in identifying one or more topics, issues, goals, etc. that the user would like the advisor panel system 100 to advise, assist, or otherwise help the user with. Additionally, the advisor panel system 100 in such arrangements optionally is configured to coach the user according to any number of different plans characterized by any number of different steps, timelines, urgencies, etc. that have been developed to lead the user towards realizing his/her goals.

The advisor panel system 100 may be utilized by a user according to any schedule, including irregular, infrequent, one-time, or other nonrecurring use, or on a more regular, reoccurring and/or frequent basis. In arrangements in which the advisor panel comprises both an advice mode and an assistance mode, the frequency and amount of use of the advisor panel system 100 in the advice mode may be the same or different from the frequency and amount of use of the advisor panel system 100 in the assistance mode.

The advisor panel circuit 200 of the provider computing system 110 is embodied or at least partly embodied in the at least one memory device 117, with at least some operations being executable by the processing circuit 113. In general, the advisor panel circuit 200 is configured to allow the advisor panel system 100 to adapt as required to provide to a user. To that effect, as illustrated in FIG. 3, according to various arrangements, the advisor panel circuit 200 of the provider computing system 110 includes a database 211, a user profile circuit 213, an optional goal identification circuit 215; an operations circuit 221, a panel creation circuit 223, a display circuit 225, a monitoring circuit 229, an implementation circuit 230, and an optional adaptive circuit 250.

The database 211 allows the advisor panel circuit 200 to retrievably store information relating to the various operations of the advisor panel circuit 200 discussed herein, and includes non-transient data storage mediums (e.g., local disc or flash based hard drives, local network servers, and the like) or remote data storage (e.g., cloud servers).

The database 211 includes data, correlations, rules, etc. by which, e.g. parameters via which the user profile circuit 213 is to filter available user-specific data to obtain and provide relevant user-specific information to a requesting circuit are defined; the mode of operation of the advisor panel is selected; the manner of presenting the advisor panel to a user using the display device 130 is defined; etc.

The database 211 stores any or all of: data, correlations, logic, baseline values that may define, or may be used as a starting point to define, any one of, or combination, of features (e.g. the composition of the advisor panel; the visual appearance, voice and/or persona of the avatars of the advisor panel; the tone of advice session; the mode of operating the advisor panel; the manner in which the advisor panel is displayed to the user; the manner in which the advisor avatars interact with one another and/or the user; optional additional content to be presented to a user, etc.) of the operation of the advisor panel; or any other contents related to the use of the advisor panel system. The contents stored by database 211 are user-created/defined and/or are based on processed data that has been aggregated from any number of different sources, including, e.g. the system database 114, third-party system 140, data aggregated and stored based on prior uses of the advisor panel system 100 by the user or other individuals, data from the adaptive circuit 250, etc. According to some arrangements, the contents of the database 211 are generally static, with the database 211 being updated only in response to pre-planned and/or user requested updates. In other arrangements, the database 211 is adaptive, with the contents of the database 211 being subject to real-time updates as new data/information is acquired/sensed by adaptive circuit 250, the system database 114, the third-party system 140 or any other source that further refines the ability of the database 211 to assist in providing advice and assistance to a user.

The user profile circuit 213 is configured to filter and narrow available user-specific information to obtain and provide to a requesting circuit (i.e. one or more of the other circuits of the advisor panel circuit 200) a relevant subset of user-specific information based on a received request from the requesting circuit. User-specific information that is obtained by the user profile circuit 213 includes existing user-specific information that is readily available and accessible by the user profile circuit 213 ("existing information") and/or newly acquired and/or previously inaccessible user-specific information ("new information") that is made available in response to a request for such information from the user profile circuit 213.

Existing user-specific information that can be immediately accessed by the user profile circuit 213 includes information that can be obtained from the system database 114 and/or from the third-party system 140 over the network 150 via the provider network interface 111. The existing information available from the system database 114 includes information obtained in relationship with, e.g., existing or prior accounts held by the user with the provider, additional provider services utilized by the user, prior uses of the advisor panel system 100 by the user, etc. Existing information available from the third-party system 140 includes, e.g., publicly available information obtained in relationship with existing or prior usage of the third-party system 140 by the user. Additionally, if the user had previously authorized the third-party system 140 to share private information from the third-party system 140 with the provider computing system 110, the existing information available to the user profile circuit 213 additionally, or alternatively, includes such private information.

As noted above, according to various arrangements, the user profile circuit 213 is also configured to request new information in response to a received request from a requesting circuit. Such new information includes information based on the usage of the third-party system 140 by the user that is not publicly available (such as, e.g., financial account information, a private social media account, a password-enabled computing device, etc.) and which the user had not previously authorized the third-party system 140 to share with the provider computing system 110.

In some arrangements, new information is also obtained by the user profile circuit 213 directly from the user via a request transmitted by the user profile circuit 213 over the network 150 using provider network interface 111 and to the user computing device 120. In such arrangements, the user profile circuit 213 is configured to transmit to the user computing device 120 any number of different surveys, user input fields, communications, questionnaires, calls, messages, recordings, or any other number of and combination of prompts to which the user responds/replies, and from which new information is obtained and provided to the requesting circuit. According to various arrangements, the prompts generated by the user profile circuit 213 and/or user responses to the prompts are transmitted between the user computing device 120 and the provider computing system 110 in the form of, e.g., a PDF or HTML document capable of being displayed on the user computing device 120, or via a graphical user interface generated by an advisor panel application 124 accessed via the user computing device 120 in response the prompt received by the advisor panel application 124 from the user profile circuit 213 over network 150.

The user-specific information accessible to the user profile circuit 213 (either as existing information or as new information) may include both explicit and implicit information. Explicit information is collected based on direct user interactions, and includes solicited information provided by the user in response to a direct prompt (e.g., user answers to surveys/questionnaires, information input by a user in an application during account set-up, preference settings input by a user, transcripts from chat sessions/call histories, etc.). According to various arrangements, explicit information is also collected based on unsolicited information shared by the user, e.g., user status updates provided by the user via social networking sites, user blog posts etc. Such explicit information is obtained by the user profile circuit 213 from saved user responses stored in the system database 114, from the third-party system 140, and/or in response to a prompt created by the user profile circuit 213. Implicit information includes user-specific information that is inferred based on monitored user behaviors and activities obtained from any number of different types of sources, such as, e.g., financial transactions, types of computing devices used by the user, physiological monitors, call/chat/text histories, information stored by cookies, mobile application utilization by the user, user web browsing histories, geolocation data associated with devices utilized by the user, social media usage/posts by the user, etc.

Instructions received by the user profile circuit 213 from a requesting circuit may include a request for user-specific information having a specific scope. Upon receiving the instructions form the requesting circuit, the user profile circuit 213 is configured to identify specific parameters by which the user profile circuit 213 filters and narrow all available user-specific information down to a small subset of relevant information that is to be provided to the requesting circuit. According to some arrangements, in addition to containing a request for user-specific information having a specific scope, the instructions from the requesting circuit also include additional variables by which the user profile circuit 213 is to filter user-specific information that is to be provided to the requesting circuit. Such variables may include limitations on, e.g., the source of the information, whether the user-information is to include existing information and/or new information, whether explicit and/or implicit information is desired, whether the user-specific information is to be limited to information related to a particular timeframe, etc.

As will be understood, according to various arrangements, as an alternative to (or in addition to) including user profile circuit 213, any or all of the requesting circuits may be configured to be capable of independently obtaining user information (including, e.g. existing, new, implicit and/or implicit information) as needed in a manner substantially similar to what has been described with regards to user profile circuit 213.

According to various arrangements, the advice provide by the advisor panel system 100 is advice that is universally applicable to most users. However, according to various arrangements, the advisor panel system 100 advantageously includes a goal identification circuit 215 that is configured to identify one or more goals of a user, such that the advice provided by the advisor panel to the user may be tailored to the specific situation of the user. According to some arrangements, the goal identification circuit 215 is additionally, optionally configured to identify one or more topics/issues that are important/pertinent/relevant to the user, such that the advice provided by the advisor panel is more specific and tailored to the user.

The goals of a user are identified according to any number of different arrangements. For example, in some arrangements, the identification of one or more goals of a user comprises utilizing the goal identification circuit 215 to import and make available previously identified user goals (such as, e.g. from a prior session of the advisor panel system 100). In other arrangements, the goal identification circuit 215 plays a more active role in identifying one or more user goals.

For example, according to some arrangements, the advisor panel system 100 is configured to utilize information stored in the database 211 to analyze information provided by the user in the context of use of the advisor panel system 100, as well as communication and/or other engagement with the advisor panel system 100 to identify one or more goals of the user. In some arrangements, the goal identification circuit 215 is additionally or alternatively configured to identify the goals of a user in response to instructions being provided by the goal identification circuit 215 to the user profile circuit 213 to obtain explicitly provided user information related to the identification of one or more user goals. In such arrangements in which the explicit user-specific information requested is also requested to be based at least in part on new information, the user profile circuit 213 is configured to transmit over the network 150, via the provider network interface 111 and to the user computing device 120, a prompt in the form of, e.g., a PDF or HTML document capable of being displayed on the user computing device 120. The prompt may be displayed by a graphical user interface generated by an advisor panel application 124 accessible by the user computing device 120 with the prompt containing one or more requested user-input fields via which the user inputs information explicitly relevant to the identification of one or more goals of the user. According to various arrangements, the user profile circuit 213 is configured to define parameters at least partially in response to information stored in the database 211, wherein the content of these user-input fields is based on the parameters defined by the user profile circuit 213.

According to some arrangements, the goal identification circuit 215 is configured to supplement (or entirely substitute) goals identified via explicit user input, with goals identified based on implicit user-specific information obtained by user profile circuit 213 based on one or both of existing or new information. Such an option is advantageous as it may, e.g., minimize the degree of direct user input or engagement required by the advisor panel system 100 to provide coaching to the user; be able to identify goals relevant to the user that the user was not able to identify him/herself; etc.

In particular, a user may not always be able to identify, recognize and/or effectively express or relay information regarding various self-attributes; may confound certain features as being indicative of specific attributes and/or identify desired, idealized, or expected future attributes instead identifying current, actual attributes; or may otherwise fail to accurately respond to prompts related to his/her own attributes. Accordingly, in some arrangements, in addition to (or as an alternative to) instructing the user profile circuit 213 to create a prompt to obtain new, explicitly provided information from the user, the user profile circuit 213 is instructed to obtain existing or new implicit information relevant to the identification of user goals. For example, in some arrangements, the prompt created and transmitted by the user profile circuit 213 to the user may also (or alternatively) contain one or more requested user-input fields via which the user inputs information implicitly relevant the identification of one or more goals of the user. According to various arrangements, the content of these user-input fields are based on parameters defined by the user profile circuit 213 at least partially in response to information stored in the database 211, and includes input fields requesting the user to provide information related to, e.g. biographical information (e.g. age, marital status, gender, education level, race, address, profession, whether the user has children, etc.); various life and/or preferences (e.g. living arrangement preferences, traveling goals, spending habits, hobbies, etc.); user financial history (e.g. types of accounts, assets, debts, monthly financial obligations, etc.), current/future life goals (possible career changes, future education plans, anticipated future travel, having children, etc.); etc. As will be understood, if the identification of user goals is based in part or entirely on implicit user information, the identification of one or more user goals by the goal identification circuit 215 further includes the goal identification circuit 215 configured to perform the additional step of extracting data indicative of one or more goals based on the analysis of the implicit user information in light of information obtained from the database 211.

In some arrangements, the operations circuit 221 is configured to define one or more modes in which the advisor panel system 100 operates. In some arrangements, the operations circuit 221 is configured to define a predetermined, preprogrammed, and unchangeable mode of operating the advisor panel. In other arrangements, the operations circuit 221 is configured to allow the operation of the advisor panel system 100 to be modified as desired.

In some arrangements, the advisor panel is operated by the operations circuit 221 in a user-initiated engagement mode. In such arrangements, the advisor panel is configured to only provide advice in response to directed questions being presented to the advisor panel by the user.

In some arrangements, the operations circuit 221 operates the advisor panel in a focused interactive user engagement mode in which advice related to a specific topic/issue that has been identified as important/relevant to the user is provided by the advisor panel based on answers/information provided by the user in response to a variety of questions posed by and conversations intended to elicit specific information initiated by the advisor panel. In other arrangements, the operations circuit 221 operates the advisor panel according to a non-focused interactive user engagement mode in which, in addition to providing information and advice in response to questions or comments from the user, the advisor panel also initiates conversations and/or raises issues that the operations circuit 221 has determined to be beneficial to the user.

As described above, according to various arrangements, an optionally provided goal identification circuit 215 is configured to analyze available user information to determine one or more user goals that may be used by the advisor panel to advise the user. According to some such arrangements, the identification of one or more user goals using the goal identification circuit 215 is determined prior to an initial interaction of the user with the advisor panel and/or without requiring any user involvement during the process of identifying the one or more user goals. Alternatively, in some arrangements, the operations circuit 221 operates the panel in a goal identification mode during which the advisor panel is configured to help guide the user through the process of identifying one or more user goals and/or relevant topics/issues using the goal identification circuit 215.

According to some arrangements, the operations circuit 221 operates the advisor panel according to a user status check mode in which, using user information obtained from any number of sources (e.g. provider computing system 110, user computing system 120, third-party system 140) either directly by the operations circuit 221 and/or via user profile circuit 213, the advisor panel provides the user with a summary of a user's current situation, such as, e.g. a user's current financial situation. For example, the advisor panel may be configured to compare the user's present financial situation to the user's past financial situation to e.g., determine trends, any significant progress and/or set-backs the user has experienced; identify/assess possible areas for change, etc. By being configured to presenting such information to the user, the advisor panel may encourage the user to self-reflect on the user's current situation, with the advisor panel configured to offer advice on how the user may address any issues or problems identified when reviewing trending information regarding the user's particular situation.

In some arrangements, the operations circuit 221 operates the advisor panel according to an observer mode in which the advisor avatars interact with one another in a conversational manner without any direct user involvement/engagement in the discussion. The operation of the advisor panel in such an observer mode provides the user with the benefit of receiving advice from one or more advisor avatars that the user can easily relate to, while also allowing the user to act as a passive outsider that can focus entirely on internalizing the advice being provided by the advisor panel. In some arrangements, the interaction between advisor avatars may be altered in an attempt to better influence the potential actions of the user. For example, the interaction between advisor avatars may comprise friendly banter, negotiation, an argument, etc.

Information presented visually to an individual often increases the ability of the user to internalize, connect with, relate to, or otherwise engage with the information that is being presented. In some situations, visual imagery may also serve as a source of encouragement that may motivate the individual to accomplish or follow through with certain tasks or actions. Accordingly, in some arrangements, the operations circuit 221 operates the advisor panel in a visualization mode in which advice from the advisor panel is augmented with visual content in a manner intended to increase the ability of the user to internalize, relate to, be motivated by, accept, etc. the advice provided by the advisor panel.

For example, when discussing a goal of the user and/or advising the user to take certain actions, the advisor panel may display to the user various scenarios that illustrate and highlight the impact on the user that accomplishing the goal and/or completing the designated actions may have on the user. As an example, according to some arrangements, when discussing a user goal of saving for retirement, the operations circuit 221 operates the advisor panel to display, e.g., side-by-side or sequential videos showing a first scenario representative of a future version of the user enjoying himself/herself in his/her retirement and a second scenario representative of the user representative of the consequences of not saving for retirement, in which the user is shown e.g., still at his/her job as a result of not having sufficient funds to retire. As another example, according to some arrangements, the advisor panel may motivate a user to take steps of paying-off credit card debts by displaying to the user various graphics or summaries that illustrate the impact on and increase in the assets of the user that no longer having to pay credit card interest rates would have for the user.

According to various arrangements, in addition to being configured to use various visual displays to motivate a user, the operations circuit 221 additionally operates the advisor panel in the visualization mode to help the user internalize the advice he/she is being provided. For example, in response to a user asking whether he/she should buy a new car, instead of, or in addition to one or more of the advisor avatars discussing the implications of such an action and the potential negative effects of such a decision, the operations circuit 221 is configured to display a montage showing, e.g.: the user initially enjoying the new car; the user subsequently being stressed by the additional monthly bills that the user must pay; and various scenes of the user having to forfeit certain experiences (e.g., not being able to afford to go home for the holidays, not having money to go out to dinner with friends, etc.); etc. The presentation of such visuals may resonate with the user in a manner that makes it easier for the user to appreciate and accept the advice that is relayed to him/her verbally by an advisor, thus increasing the likelihood that that the user will heed and benefit from the advice that is provided.

As discussed previously, according to various arrangements, in addition to providing advice, the advisor panel system 100 optionally includes an assistance mode in which the advisor panel system 100 provides the user with any number of different types of assistance, such as, e.g., coaching a user towards implementing the advice provided by the advisor panel so as to assist the user with accomplishing one or more goals of the user. Although in some arrangements this assistance from the advisor panel system 100 is provided on a one-off, or infrequent schedule, according to various arrangements the assistance provided by the advisor panel system 100 when in the assistance mode may be defined by significant amounts of regular interaction between the advisor panel system 100 and the user. As will be understood, in arrangements in which the advisor panel system 100 includes an assistance mode, the user is provided with an option to turn-off or disable the assistance mode and operate the advisor panel system 100 in an advice-only mode without effecting the manner in which the advisor panel system 100 operates in the advice-only mode.

As will be understood, the advisor panel system 100 may be configured to operate according to any number of different methods in the assistance mode. According to one exemplary arrangement, the advisor panel system 100 may directly incorporate, or may otherwise utilize, a virtual coaching system such as described in U.S. patent application Ser. No. 16/156,512, filed Oct. 10, 2018 and titled "SYSTEM AND METHOD FOR PROVIDING VIRTUAL COACHING", incorporated by reference herein in its entirety, in the assistance mode. In such arrangements, one or more of the advisor avatars defining the advisor panel may additionally serve as the virtual coach(es) that coaches the user in the manner described in the SYSTEM AND METHOD FOR PROVIDING VIRTUAL COACHING application based on the advice provided by the advisor panel of the advisor panel system 100.

As will be understood, according to some arrangements, it may not be possible to operate the advisor panel system 100 in an assistance mode for any number of different reasons. Accordingly, in some such arrangements, (including arrangements in which the advisor panel system 100 includes both an advice mode and an assistance mode) the operations circuit 221 includes a bootcamp mode in which, in addition to providing advice, the advisor panel is additionally operated to provide the user with specific suggestions, tasks, deadlines, tips, instructions, etc., intended to assist and guide the user in implementing some or all of the advice presented to the user. For example, in some arrangements in which the advisor panel is configured to advise a user regarding the purchase of a home, in addition to advising the user with regards to the best lending options available for financing his/her home purchase, considerations regarding the purchase of a home, etc., the advisor panel may additionally be configured to provide the user (e.g. via an email sent to the user's email address; a text message sent to the user's phone, information displayed on the display device 130, etc.) with a list of various documents and information that the user will need to compile and prepare during the home buying process. As another example, according to other arrangements, as part of advising a user with regards to how the user can improve his/her financial situation, the advisor panel may be configured to interact with the user to develop a detailed plan and budget via which the user should allocate his/her income to improve the financial situation of the user.

In some arrangements, the panel creation circuit 223 is configured to generate the advisor avatars that define the advisor panel. The panel creation circuit 223 is configured to allow for the selection of any number or combination of 'past,' 'present,' and/or 'future' advisors to define the advisor panel. According to various arrangements, in addition to selecting whether the advisor panel includes a past, present and/or future advisor, the panel creation circuit 223 is configured to allow for more than one version of any one or all of the past, present and/or future advisors to be included in the advisor panel. For example, in some arrangements the advisor panel is configured to include multiple past and/or future advisor avatars representative of different stages/ages in the user's past and/or future. Alternatively, or additionally, in some arrangements, such as, e.g., in arrangements in which the operations circuit 221 operates the advisor panel to display a future version of the user according to various scenarios, the multiple versions the past, present and/or future advisor avatars are reflective of the different scenarios/assumptions under which the operations circuit 221 is operating the advisor panel.

In some arrangements, the panel creation circuit 223 is configured to create avatar(s) defined by any number and combination of various physical, vocal and personality traits. However, as noted above, a user may feel more comfortable and/or may be more likely to relate to and trust an advisor that is reflective of the user. Accordingly, in various arrangements, the panel creation circuit 223 is configured to select one or more of the traits defining the avatars based on one or more traits of the user.

In arrangements in which the avatars are reflective of one or more features of the user, the panel creation circuit 223 is configured to use any number of, and combination of, photo images, video images, and/or voice recording as well as age progressions systems or methods to define the visual appearance of and/or the sound of the voice of the advisor avatars. The photo images, video images and/or voice recordings are obtained from any number of sources, such as, e.g. directly from the user (e.g. provided via user computing device 120), from third-party system 140, via an optionally provided recording device component of the display device 130 during set-up of the advisor panel system 100 and/or during use of the advisor panel system 100, etc. In some arrangements, in addition to using video images and/or voice recording to more define the visual appearance and/or voice of the avatars, the panel creation circuit 223 optionally is also configured to use this information to generate avatars that additionally reflect the various mannerisms, speech patterns, personality traits, gestures, ticks, etc. of the user.

As an alternative to, or in addition to, including avatars based on the user in the advisor panel, in some arrangements the advisor panel includes one or more past, present, and/or future versions of one or more individuals that the panel creation circuit 23 has been configured to identify as someone from whom the user would listen to and follow advice. In such arrangements, the panel creation circuit 223 is configured to identify these individuals based on existing user profile data and/or new information obtained from a user (e.g. via communications transmitted to user computing device 120; obtained directly by the panel creation circuit 223 and/or via user profile circuit 213; etc.) and correlations and other data from the database 211. Once such one or more individuals have been identified, the panel creation circuit 223 is configured to create avatars based on the identified individual(s) in a manner similar to that described above.

As will be understood, although according to various arrangements the advisor avatars created by the panel creation circuit 223 are generated to be as realistic as possible, in other arrangements, the advisor avatars may be defined according to any number of visual styles.

The display circuit 225 displays the one or more avatars and any optionally included additional content (e.g. montages used in visualizations, progress graphs, etc.) on the display device 130 according to any number of different arrangements, settings, configurations, etc. For example, in some arrangements, the display circuit 225 only displays a single advisor avatar on the display device 130 at any given point in time. In some such arrangements, the user initiates a change in the avatar that is displayed by the display device 130 by, e.g. swiping the screen (e.g. in embodiments comprising a touchscreen display); clicking a different page view for the desired avatar the user wishes to view; etc. In other arrangements, the display circuit 225 is configured to automatically change the displayed avatar to the avatar with whom the user is conversing. In other arrangements, some or all of the advisors are alternatively presented simultaneously by the display device 130.

According to various arrangements, one or more aspects defining the manner in which the display circuit 225 displays the advisor panel are determined or influenced by the particular structure of the display device 130. According to various arrangements, the display circuit 225 is configured to detect the nature, size, and/or other features of the display device 130 and automatically adjusts the manner in which the advisor panel is displayed to the user.

For example, in arrangements, such as, e.g. illustrated in FIG. 2C, in which the display device 130 is defined by a plurality of segmented panels, the display circuit 225 displays a different advisor avatar in some or all of the panels. According to some arrangements, one or more of the panel segments comprise a mirror surface in which no avatar is displayed. As illustrated by FIG. 2B, as another example, according to some arrangements in which the display device 130 is displayed by a limited display screen size, the display circuit 225 is configured to utilize one or more picture-in-picture windows 204 to allow each of the avatars to be viewed at the same time, with the display circuit 225 configured to update the main display 202 such that the advisor avatar that is communicating with the user at a particular point in time is displayed in the main window 206 of the display device 130.

According to various arrangements, the display circuit 225 is configured to utilize various visual and/or audio effects when presenting the advisor panel to the user. For example, according to some arrangements, the display circuit 225 is configured to use variations in color or tone to distinguish between different versions of advisor avatars. For example, montages used in visualizations depicting best-case scenarios may be displayed using bright, vibrant colors while montage depicting worst-case scenarios are shown using muted colors.

The additional optionally provided content provided by the display circuit 225 may comprise content of any desired nature (e.g. text, audio, haptics, video, photos, etc.) that the implementation circuit 230 has been configured to select for any number of different purposes. For example, according to various arrangements, the content selected by the implementation circuit 230 includes content intended to, e.g. provide a user with an overview of one or more sets of data (e.g. graphs, charts, etc.); educate the user about a specific topic (e.g. written material and/or information video, etc.); motivate the user (e.g. a picture related to a goal of the user); provide a link to a third-party system 140 application, system, network, etc. that is of use to the user; etc. According to various arrangements, the additional content generated by the display circuit 225 includes content obtained from any number of different sources, including, e.g. the database 211, the system database 114, the user computing device 120, the display device 130, the third-party system 140, etc.

An optional monitoring circuit 229 is configured to monitor and collect various types of user information prior to, during and/or subsequent to an advisor panel session. As will be described below, according to various arrangements, such information collected by the monitoring circuit 229 is used by the implementation circuit 250 and/or adaptive circuit 250 to improve current and future advisor panel sessions.

According to various arrangements, the monitoring circuit 229 is configured to utilize the optionally provided one or more physiological sensor(s) that are integrally and/or operably provided with the display device 130 to measure or observe any number of different physiological states in a user. Based on the detected physiological conditions and correlations between such measured physiological states and associated one or more emotional conditions, the monitoring circuit 229 is configured to determine an emotional state of the user, which in turn may be used by the implementation circuit 230 and/or adaptive circuit 250 configured to modify any number of features related to the operation of the advisor panel based on correlations between the determined emotional state and suitable advisor panel features selections stored in the database 211.

In addition to being used to determine an emotional state of a user during an advisor panel session, according to various arrangements, subsequent to the advisor panel session, the monitoring circuit 229 may be configured to utilize the user profile circuits 213 to obtain relevant user-specific information related to one or more expected user behaviors and activities which is used by the adaptive circuit to determine the effectiveness of the advice provided and manner in which the advisor panel was operated during the advisor panel session.

The implementation circuit 230 is configured to define the manner in which the advisor panel operates to advise a user during an advice session by determining: the composition of the advisor panel; the visual appearance, voice and/or persona of the avatars of the advisor panel; the overall tone of advice session (e.g. informative, direct, succinct, encouraging, critical, humorous, brash, serious, passive, use positive and/or negative reinforcement, etc.); the mode of operating the advisor panel; the manner in which the advisor panel is displayed to the user; the manner in which the advisor avatars interact with one another and/or the user; the advice that is provided by the advisor panel system; the scope and content of any optional additional content provided to the user during an advice session, etc. best suited to and most effective in advising the user. According to various arrangements, the manner in which the advisor avatars interact with one another and/or the user is based on the overall tone of the advice session and/or user-specific information obtained using the user profile circuit 211 related to the manner in which the user typically interacts/engages with others.

As will be understood, according to various arrangements, the implementation circuit 230 may be configured to determine any or all of: the composition of the advisor panel; the visual appearance, voice and/or persona of the avatars of the advisor panel; the tone of advice session; the mode of operating the advisor panel; the manner in which the advisor panel is displayed to the user; the manner in which the advisor avatars interact with one another and/or the user; and the nature of any optional additional content to be provided to the user during an advice session based any number of different factors.

As will be described below, in some arrangements, the adaptive circuit 250 is configured to determine baseline values for some or all of the features (e.g., the mode of operating the advisor panel defined by the operations circuit 221, the tone of the advisor panel session, the selection of and/or the traits of the advisor avatars created by panel creation circuit 223, and/or the manner in which the advisor panel is displayed to the user by the display circuit 225, etc.) of the advisor panel over the course of use of the advisor panel system 100, with the selection of some or all of the features defining the operation of the advisor panel by the implementation circuit 230 in some such arrangements being based entirely or partially on the baseline values determined by the adaptive circuit 250 and stored in the database. According to some arrangements, the baseline values stored in the database 211 are based on prior uses of the advisor panel system 100 by the user and/or based on prior uses of the advisor panel system 100 by other users having any number of similar traits (e.g. age, education level, profession, geographic location, income level, net worth, types of accounts, gender, race, marital status, children, housing status, etc.) as the user.

In some arrangements, some or all of the features defining the operation of the advisor panel are defined exclusively by user-based input(s). For example, according to some such arrangements, the implementation circuit 240 is configured to instruct the user profile circuit 213 to transmit over the network 150, via the provider network interface 111 and to the user computing device 120 a prompt configured to be displayed on the user computer device 120 (e.g., PDF or HTML, a graphical user interface displayable by the advisor panel application 124, etc.) via which the user inputs information explicitly relevant the identification of user preferences related to various advisor panel features. According to various arrangements, the content of these user-input fields is based on parameters defined by the user profile circuit 213 at least partially in response to information stored in the database 211.

According to other arrangements, the implementation circuit 230 is configured to supplement, or entirely substitute, user preferences identified via the user-based inputs (and/or baseline values) with user preferences identified based on implicit user-specific information obtained by user profile circuit 213 based on one or both of existing or new information. Such an arrangement may be advantageous as it may, e.g., minimize the degree of direct user input or engagement required by the advisor panel system 100 to provide advice to the user. Additionally, a user may not always be able to identify or recognize which features would be most suitable and appropriate to his/her situation, personality, etc. Accordingly, in some arrangements, in addition to (or as an alternative to) being configured to instruct the user profile circuit 213 to create a prompt to obtain new, explicitly provided information from the user, the implementation circuit 230 is configured to instruct the user profile circuit 213 to obtain existing or new implicit information relevant to the identification of user preferences related to advisor panel features. For example, in some arrangements, the prompt created and transmitted by the user profile circuit 213 to the user also (or alternatively) contains one or more requested user-input fields via which the user inputs information implicitly relevant to the identification of advisor panel interaction/assistance settings. As will be understood, if the identification of advisor panel feature preferences is based in part or entirely on implicit user information, the identification of one or more user preferences by the implementation circuit 240 includes the additional steps of extracting data indicative of one or more user preferences related to advisor panel features from the obtained implicit user information in light of the various logic and correlation information stored in the database 211.

In arrangements in which the selections of advisor panel features related to the manner which the advisor panel operates is not entirely based on direct user input and/or baseline features, according to various arrangements, the implementation circuit 230 is configured to select these features based on one or both of the goal(s) and/or topics/issues of relevance of the user and the personality, habits, and other traits of the user. In such arrangements, the implementation circuit 230 contains logic via which the implementation circuit 230 is configured to determine (using information stored in the database 211) the extent and influence that the goal(s) and/or topics/issues of relevance to the user and/or the personality, habits, and other traits of the user have in the selection of features related to the operation of the advisor panel. Once this determination is made, the coaching circuit 230 is configured to instruct the user profile circuit 213 to obtain relevant user-specific information.

Using the obtained user-specific information and correlations stored in the database 211 that associate various goal(s) and/or topics/issue and various personality traits to specific types of: advice to be provided to the user; operating modes, advisor panel avatar composition selection, advisor avatar features, manners of displaying the advisor panel, additional content to display to a user, overall tone of the advisor panel session, etc. most likely to resonate and engage a user, the implementation circuit 230 is configured to operate the advisor panel (directly and/or in conjunction with instruction provided to the operations circuit 221, panel creation circuit 223, and/or display circuit 225) in accordance with the determined optimal mix of characteristics.

In some arrangements, the features initially selected during set-up of the advisor panel system 100 remain static over the course of the operation of the advisor panel. In other arrangements, the features initially selected during set-up of the advisor panel system 100 are semi-static, with different features being assigned to apply to various aspects of the operation of the advisor panel under specific different circumstances, but with the initially selected features and the rules by which the initially selected features are subsequently varied remaining static and unchanged over the course of the use of the advisor panel system 100.

As will be understood, according to other arrangements, some or all of the features defining the operation of the advisor panel may be adjusted as desired/dictated by the user and/or advisor circuit 200 during the course of the advisor panel session. For example, in order to better tailor the advisor panel session to the user, according to some arrangements, the implementation circuit 230 utilizes the changes to the emotional state of the user (e.g. anxiety, anger, boredom, happiness disdain, disinterest, embarrassment excitement, engagement, confusion, etc.) determined using the monitoring circuit 229 and correlations stored within the database 211 to assess whether changes to any of the features of the advisor panel would improve the advisor panel session. For example, in response to determining that the user is bored or shows a lack of interest, the correlations from the database 211 may indicate that the implementation circuit 230 should modify the tone of the advisor panel session to a more humorous tone. As another example, in response to detecting that the user appears to show signs of anger and embarrassment when interacting with a past avatar, the correlation from the database may indicate that the implementation circuit 230 should, e.g. minimize the use of the past avatar.

According to various arrangements, during the operation of the advisor panel system, in addition to continuously analyzing data obtained from the monitoring circuit 229 in light of information stored in the database 211 to adapt and modify the advisor panel and/or operation of the advisor panel, the implementation circuit 230 additionally is configured to utilize the user profile circuit 213 (using correlations from the database 211) to obtain user-specific information to better adapt the operation of the advisor panel and/or operation of the advisor panel. For example, if, in the hypothetical noted above in which a user appears to shows signs of anger and embarrassment, the user profile circuit 213 were to be configured to identify user-specific information indicative of poor financial decisions made by the user in the past, the implementation circuit 230 may be configured to instruct the operation circuit 221 to operate in a bootcamp mode in which the advisor panel advises the user regarding various steps the user can take to make up for his/her prior financial decisions in the past.

In addition to modifying/adapting the advisor panel and/or manner of operating the advisor panel during an advisor panel session using data obtained from the monitoring circuit 229 in some arrangements, the implementation circuit 240 is configured to compare statements made/questions posed by the user to data stored in the database 211 to determine and/or identify one or more features of the advisor panel that are associated to the comment/question, and update one or more features of the advisor panel accordingly. For example, according to some arrangements, based on correlations stored the database 211, in response to detecting a user communications/questions posed such as "should I," "what if," "what will happen," etc., the implementation circuit 230 may be configured to instruct the operations circuit 221 to operate the advisor panel in the visualization mode.

According to various arrangements, the advisor panel circuit advantageously includes an adaptive circuit 250 that is configured to adapt and refines the operation of the advisor panel. In particular, according to various arrangements, the adaptive circuit 250 may be configured to apply any number of different analytics to aggregated data related to the use of the advisor panel to extract and refine various correlations between advisor panel features, advice provided by the advisor panel, various traits of the user and the goals and topics/issues relevant to the user and resulting user behavior. This newly acquired data and/or information is stored in the database 211, thereby allowing the advisor panel to operate in future advisor panel sessions in a more nuanced and dynamic manner to better suit and be more relevant to each individual user.

In particular, according to various arrangements, as the user and/or other individuals utilize the advisor panel system 100, the adaptive circuit 250 is configured to analyze data related to the use of the advisor panel system 100 obtained from the monitoring circuit 229 to determine patterns and correlations between: the mode in which the panel is being operated, the advice being provided, the advisor avatars of the advisor panel, the tone of the advisor panel session; the manner in which the advisor panel is displayed to the user, the profile of the user, etc. as measured, e.g. by quantitatively defined progress toward the one or more goals and/or issues/topics addressed by the advisor panel, monitored trends in user behavior, user-reported feedback, etc. obtained via the monitoring circuit 229.

In response to any correlations, inferences, patterns, etc. being detected by the adaptive circuit 250, the data, logic, correlations or other content of the database 211 is updated accordingly. According to some arrangements, the adaptive circuit 250 is also optionally configured to update the database 211 based on aggregated data from other sources, such as, e.g. system database 114, third-party system 140, etc. or other sources of information relevant to the operation of the advisor panel system 100. By updating the database 211 with such additional, updated information that correlates, e.g. specific: monitored user behavior or activities, user traits, particular goals and/or topics/issues of interest, etc. with advisor panel traits and features (including, e.g. persona of the advisor avatars; mode in which the advisor panel is operated; advice provided; manner in which the advisor panel is displayed; tone of the advisor panel session, etc.) the effectiveness of the ability of the advisor panel system 100 to advise, assist, inform, coach, etc. users of the advisor panel system 100 is increased.

According to some arrangements, when sufficient data has been collected, analyzed and correlated to specific advisor panel features by the adaptive circuit 250, new and/or updated baseline values for any or all of the operations circuit 225, the panel creation circuit 223, the display circuit 223 and/or the implementation circuit 230 may defined and stored in the database 211, with the advisor panel system 100 configured to automatically operate the advisor panel in a default mode using the baseline values, allowing the user to receive customized advice from the advisor panel system 100 without requiring the user to spend time or effort in setting up, customizing, or providing information that would otherwise be required to provide the user with a user-specific advice and/or without requiring user-specific information. In some such arrangements, the baseline values for any or all of the operations circuit 225, the panel creation circuit 223, the display circuit 223 and/or the implementation circuit 230 are based on data from the adaptive circuit 250 generated in response to the analysis by the adaptive circuit 250 of data aggregated from: the use of the advisor panel system 100 by all users or; usage of the advisor panel system 100 by a specific user; and/or the use of the advisor panel system 100 by users of similar backgrounds to the user (e.g. age, geographical location, marital status, income level, net worth, etc.).

In some arrangements, the adaptive circuit 250 is configured to review and analyze monitored data indicative of user behavior and activities subsequent to an advisor panel session obtained using monitoring circuit 229 to determine the effectiveness of the advisor panel system 100 Specifically, according to some arrangements, the database 211 may store correlations between different types of advice provided and one or more expected user behaviors or activities that are to be monitored to assess the effectiveness of the advice provided. By monitoring these expected user behaviors and activities, the adaptive circuit 250 is configured to be able to fine-tune and improve the advice provided by the advisor panel and/or the operation of the advisor panel to increase the likelihood that the advisor panel system 100 will be beneficial to a user.

For example, for a user that was provided advice regarding retirement savings options, the adaptive circuit 250 may configured to indicate that the expected user behaviors and activities that should be monitored are whether any new financial accounts have been opened subsequent to the advice panel session. Based on this information from the database 211, the monitoring circuit 229 may be configured to monitor third-party system 140 and/or provider computing system 130 to determine whether any new accounts have been opened by the user. According to various arrangements, in response to detecting that the user opened a retirement savings account, the adaptive circuit 250 is configured to update the database 211 to correlate the features of the advisor panel used during the session with one or more user traits, such that in future uses of the advisor panel system 100 with the same user and/or with a user determined to have similar user traits utilizes such a combination of advisor panel features as a baseline for operating the advisor panel. Additional, or alternatively, according to some arrangements, the adaptive circuit 250 is configured to update the database 211 to correlate the specific advice provided to the user with the one or more user traits and the one or more goals and/or topics/issues based on which the advice had been provided in the sessions, such that in future uses of the advisor panel system 100 with users sharing having traits and goals(s) similar to those of the user, are provided with similar advice regarding retirement saving options.

The assessment of the effectiveness of the advisor panel may be more difficult in situations in which expected user behavior and activity related to the advice provided by the advisor panel is not detected by the monitoring circuit 229 subsequent to the advisor panel session. As will be understood, there may be any number of reasons a user may not have followed the advice provided by the advisor panel. Although some of these reasons may be attributable to the specific advice provided by the advisor panel being inapplicable to the user and/or the manner in which the advisor panel was operated, the failure to detect the expected user activity and behavior may be attributed to any number of other reasons unrelated to the advice provided by the advisor panel and/or the manner in which the advisor panel was operated (e.g. the goal/topic no longer being of relevance to the user, changes in the situation of the user, inability to detect/monitor the expected user activity, etc.)

In light of the various unrelated reasons that may result in no expected user being detected, in some arrangements, instead of updating the database 211 to indicate the particular advice provided and/or the selection of advisor panel features as having been ineffective, the adaptive circuit 250 may instead be configured to flag such advisor panel sessions for follow-up once additional data has been obtained that would allow for a more nuanced statistical analysis to determine the likelihood that the ineffectiveness was attributed to the features of the advisor panel. Additionally, or alternatively, in some arrangements, prior to updating the database 211 to indicate certain advice and/or advisor panel features as being ineffective, the implementation circuit 230 may be configured to make incremental adjustment to the advice and/or advisor panel features, with the adaptive circuit 250 subsequently configured to determine whether such adjustments to the features (as opposed to entire substitution of various features) is sufficient to elicit a desired improvement in the effectiveness of the advisor panel system.

Figure 4:
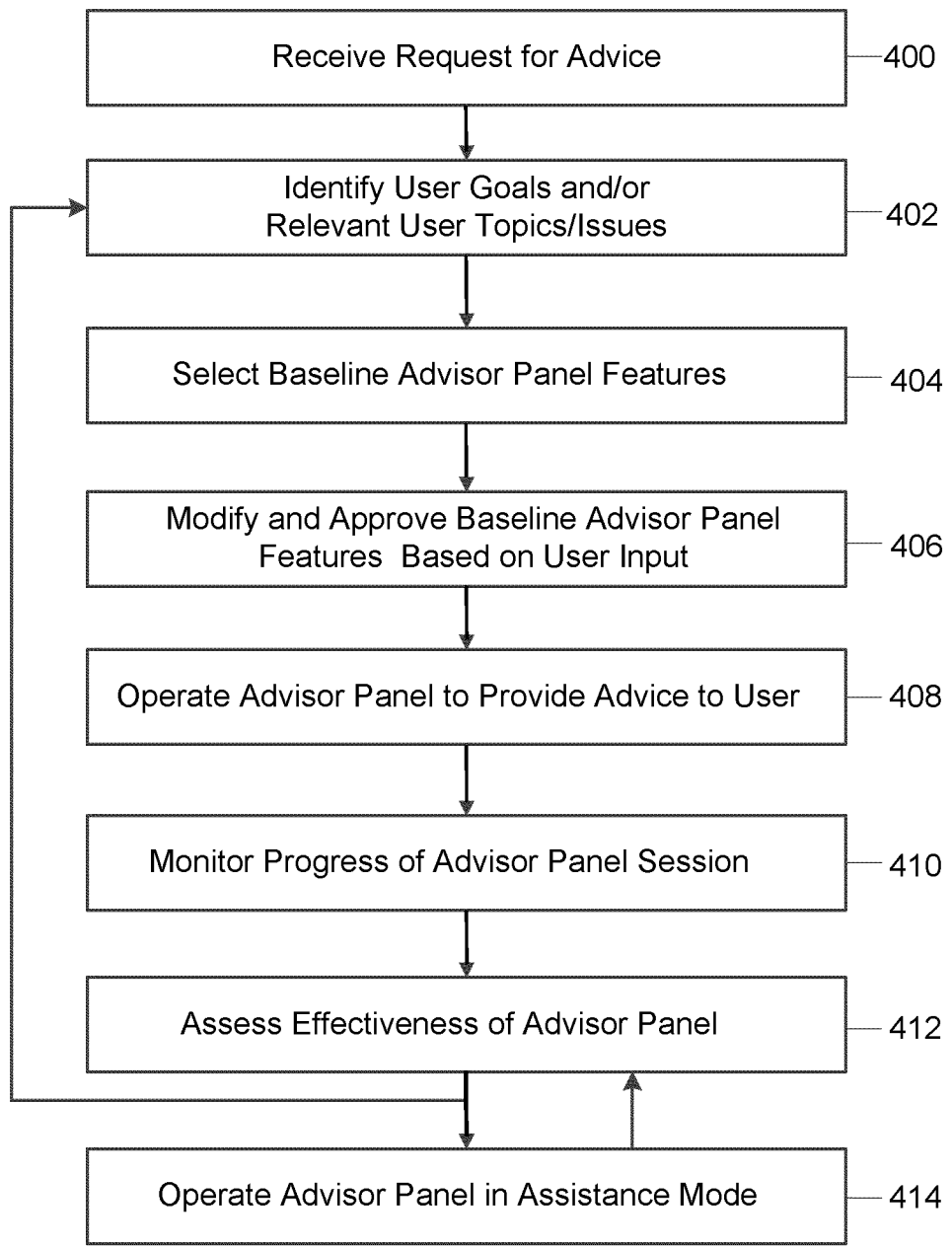
FIG. 4 is a flow diagram of a process or method for providing coaching, according to an example embodiment.

Referring to FIG. 4, a method for providing advice using an advisor panel is illustrated according to one arrangement. In some arrangements, the method illustrated in FIG. 4 is performed by advisor panel system 100. Performance of the method is not intended to be restricted to the example implementation advisor panel system 100. In some arrangements, the method of FIG. 4 is performed at least partially offline.

At step 400, a request for advice is received. According to various arrangements, the advisor panel system 100 is provided and utilized as a standalone system, with the method for providing user-specific advice being provided and initiated in response to an independently received request received directly from a user, such as e.g. in response to a user downloading and installing the advisor panel application 124 on a mobile device of the user. In other arrangements, an option to download the advisor panel application 124 and/or otherwise access the advisor panel system 100 is presented to a user in response to the user by a user of a secondary application, program or system, such as, e.g. a mobile banking application provided as an additional circuit 116 of the provider computing system 110, with user-specific virtual coaching being provided and initiated in response to the user accepting the option to access the advisor panel 100 presented by the secondary application, program or system. In yet other arrangements, the advisor panel system 100 is provided as a part of a secondary application, program or system offered by an additional circuit 116 of the provider computing system 110 and/or a third-party system 140 (e.g. as part of an overall-life coaching application), with the user-specific virtual coaching being provided and initiated in response to the user of the secondary application, program or system by the user.

In response to receiving a request to provide advice to a user, at step 402, one or more goals of a user are optionally identified. In some arrangements, goal identification circuit 215 is configured to perform this step. As described previously, in some arrangements, the identification of the one or more user goals is optionally performed without any user involvement, while in other arrangements, the user may be guided through the processing of identifying one or more goals using goal identification circuit 215 by the advisor panel. As will be understood, in arrangements in which the advisor panel is configured to provide generally universally applicable advice, step 402 of identifying one or more user goals includes the goal identification circuit 215 configured to identify overall health (e.g., overall financial health, overall physical health, etc.) as the user goal.

At step 404, baseline values that are to define an advisor panel and manner of operating the advisor panel are defined. According to some arrangements, the implementation circuit 230 is configured to instruct the user profile circuit 231 to obtain user-specific information related to the personality of the user and/or preferences of the user. In response to receiving requests from the implementation circuit 235, the user profile circuit 213 is configured to obtain parameters from the database 211 by which the user profile circuit 213 filters available user-specific information to obtain subset(s) of information related to the personality of the user and/or preferences of the user and which can be provided to the requesting implementation circuit 230. Upon receipt of the requested information, the logic of the implementation circuit 230 is configured to analyze the received personality of the user and/or preferences of the user against information from the database 211 to identify various features that are to define the advisor panel and the manner in which the advisor panel is operated. Based on this information identified by the implementation circuit 230, a baseline advisor panel and manner of operating the advisor panel are defined.

According to various arrangements, at step 404, the user-specific information searched by the user profile circuit 213 is defined by existing information, with the parameters identified by the user profile circuit 213 being configured to, among the types of information, obtain information related to, e.g. the digital interaction footprint of the user (related to user interactions with others), traits of the user identified from prior questions/conversation, passive chat session, the syntax of user communications (e.g. whether full sentences of used, or if slang or text language is used), types of words used by the user (e.g. emotion, analytical), social network data, geolocation data.

In some arrangements, in addition to, or as an alternative to the use of the obtained user-specific information to define the baseline advisor panel features, a baseline advisor panel and manner of operating the advisor panel are defined based on data stored in the database 211, such as, e.g., baseline values for advisor panel features that correspond to the use of the advisor panel system 100 by other users having any number of similar traits (e.g. age, education level, profession, geographic location, income level, net worth, types of accounts, gender, race, marital status, children, housing status, etc.) as the user.

At step 406, the implementation circuit 235 optionally presents to the user (via, e.g. a graphical user interface displayed by virtual coaching application 124 accessed by the user computing device 120) the baseline advisor panel features that are to define the advisor panel and by which the advisor panel is to interact with/advise the user to the user for user review. According to various arrangements, as part of providing the baseline features of the advisor panel to the user for approval, the implementation circuit 230 also allows the user to modify one or more of the features of the advisor panel such as, e.g., the tone of advisor panel session; the type of langue used by the advisor avatars, the mode of operating the advisor panel; the selection of avatars to be include in the advisor panel; the traits defining the advisor avatars; the manner in which the advisor panel is to be displayed to the user; etc. Upon receipt of the user selections (obtained, e.g. via the graphical user interface) by the implementation circuit 230, the baseline features of the advisor panel are updated as needed to create a finalized user-specific advisor panel.

At step 408, the implementation circuit 230 instructs: the operations circuit 221 to operate the advisor panel; the panel creation circuit 223 to create an advisor panel composed of the advisors; the panel creation circuit 223 to defined the traits of the advisor avatars; the display circuit 225 to display the advisor panel; etc. in a manner defined by the various feature characteristics selected during step 406 and operates the advisor panel using the tone determined in step 406 to provide advice to the user.

According to various arrangements, at step 410, during the advisor panel session, the monitoring circuit 229 is configured to monitor user physiological activity and behavior based on readings received from one or more sensors; image/video capture devices; and/or any other type of devices capable of providing feedback regarding a physiological state or condition of a user. The data obtained by the monitoring circuit 229 is used to determine an emotional state of the user, which is then used by the implementation circuit 230 to modify some or none of the features of the advisor panel (such as, e.g., the mode of operating the advisor panel defined by the operations circuit 221, the tone of the advisor panel session, the selection of and/or the traits of the advisor avatars created by panel creation circuit 223, the advice provided by the advisor panel, the manner in which the advisor panel is displayed to the user by the display circuit 225, etc.) based on correlations and data stored in the database 211 that associates one or more user emotional states or conditions to specific characteristics deemed most appropriate to define some or all of the various features. As will be understood, according to various arrangements, the monitoring and modification of advisor panel features of step 410 occurs multiple times over the course of the advisor panel session.

According to various arrangements, at step 312, following the termination of the advisor panel session, the adaptive circuit 250 reviews and analyzes the monitored data obtained during step 410 and/or monitor data obtained by monitoring circuit 229 subsequent to the termination of the advisor panel session to determine the effectiveness of the advice provided by the advisor panel and/or the operation of the advisor panel. In various arrangements, the adaptive circuit 230 determines new baseline values and/or updates existing baseline values for some or all of the features of the advisor panel, with the adaptive circuit 250 updating the database 211 with any such new/updated values and/or newly acquired data, correlations, making this information available for future use by the advisor panel system 100.

In arrangements in which the advisor panel includes an assistance mode, at step 414, the advisor panel system 100 operates the advisor panel to assist the user based on the advice provided by the advisor panel during operation of the advisor panel in the advice mode. As discussed above, according to various arrangements, the assistance provided by the advisor panel in the assistance mode include coaching of the user based on a plan developed in response to the advice provided by the advisor panel. As will be understood, according to various arrangements, the user may switch between use of the advisor panel in the advice mode and assistance mode one or more time over the course of the user of the advisor panel system. Additionally, according to various arrangements, the effectiveness of the advisor panel in the assistance mode is determined using the adaptive circuit 250 and used to update and fine-tune the operation of the advisor panel system 100 in a manner similar to that described with reference to the use of the adaptive circuit 250 to monitor the effectiveness of and improve the operation of the advisor panel in the advice mode.

The arrangements described herein have been described with reference to drawings. The drawings illustrate certain details of specific arrangements that implement the systems, methods, and programs described herein. However, describing the arrangements with drawings should not be construed as imposing on the disclosure any limitations that may be present in the drawings.

It should be understood that no claim element herein is to be construed under the provisions of 35 U.S.C. § 200(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors embodied in various ways. The one or more processors constructed in a manner sufficient to perform at least the operations described herein. In some arrangements, the one or more processors shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors structured to perform or otherwise execute certain operations independent of one or more co-processors. In other example arrangements, two or more processors coupled via a bus to enable independent, parallel, pipelined, or multi-threaded instruction execution. Each processor implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors external to the apparatus, for example the one or more processors a remote processor (e.g., a cloud-based processor). Alternatively, or additionally, the one or more processors internal and/or local to the apparatus. In this regard, a given circuit or components thereof disposed locally (e.g., as part of a local server, a local computing system, etc.) or remotely (e.g., as part of a remote server such as a cloud-based server). To that end, a "circuit" as described herein may include components that are distributed across one or more locations.

An exemplary system for implementing the overall system or portions of the arrangements might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some arrangements, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitors, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described to explain the principals of the disclosure and its practical application to enable one skilled in the art to utilize the various arrangements and with various modifications as are suited to the particular use contemplated. Other substitutions, modifications, changes, and omissions may be made in the design, operating conditions, and arrangement of the arrangements without departing from the scope of the present disclosure as expressed in the appended claims.

We claim:

1. A system for providing advice to a user comprising:
a display device; and
a provider computing system configured to:
obtain personal information related to a user;
analyze the personal information to identify one or more traits of the user;
create a first advisor avatar and a second advisor avatar that is visually distinct from the first advisor avatar, wherein a visual appearance of each of the first advisor avatar and second advisor avatar is based on a visual appearance of the user, at least one of the first advisor avatar and second advisor avatar being defined by an age progression modified version of the current visual appearance of the user;
identify a financial goal of the user;
identify one or more tasks related to the identified financial goal;
display, via the display device, the first advisor avatar;
communicate, using the first advisor avatar displayed by the display device, the one or more tasks to a user; and
communicate, using the second advisor avatar displayed by the display device, information related to the financial goal of the user;
wherein the provider computing system executes an observer mode where the first advisor avatar and second advisor avatar are displayed by the display device concurrently and where the first advisor avatar communicates with the second advisor avatar to provide instructions to the user to complete the one or more tasks for achieving the financial goal without any direct involvement from the user, and wherein the provider computer system modifies the visual appearance of the first advisor avatar and the second advisor avatar in accordance with a first scenario in which the one or more tasks are completed, and modifies the visual appearance of the first advisor avatar and the second advisor avatar in accordance with a second scenario in which the one or more tasks are not completed.

2. The system of claim 1, wherein the one or more traits of the user are obtained by the provider computing device from a source of user personal information that has been obtained through monitored usage of a computing device by the user.

3. The system of claim 1, the provider computing system further being configured to associate the one or more tasks with one or more expected user behaviors, and subsequent to communicating the one or more tasks, monitor the behavior of the user to determine whether the one or more tasks have been completed.

4. The system of claim 1, wherein the display device comprises a computing device of the user.

5. The system of claim 1, wherein the provider computing system is configured to determine a size of a display screen of the user computing device and adjust the display of the first advisor avatar to the determined display screen size.

6. The system of claim 1, wherein the provider computing system is configured to display the first advisor avatar and the second advisor avatar to the user simultaneously during both the communication using the first advisor avatar and during the communication using the second advisor avatar.

7. The system of claim 1, wherein the display device is defined by a plurality of segmented panels, and the provider computing system is configured to display the first advisor avatar in a first panel and the second advisor avatar in a second panel.

8. The system of claim 7, wherein at least one panel of the display device comprises a mirror.

9. The system of claim 7, wherein the first advisor avatar is displayed in the first panel concurrently with the display of the second advisor avatar in the second panel.

10. The system of claim 1, wherein each of the first advisor avatar and second advisor avatar are defined by an age progression modified version of the current visual appearance of the user, the first advisor avatar and second advisor avatar being visually distinct from one another.

11. The system of claim 1, wherein the other of the first advisor avatar and second advisor avatar is defined by a prior visual appearance of the user that is visually distinct from a current visual appearance of the user.

12. The system of claim 1, wherein the other of the first advisor avatar and second advisor avatar is defined by a current visual appearance of the user.

13. The system of claim 1, wherein both the first advisor avatar and second advisor avatar are concurrently displayed during at least one of communicating using the first advisor avatar and communicating using the second advisor avatar.

14. A method of providing advice to a user using a provider computing device comprising:
obtaining personal information related to a user;
analyzing the personal information to identify one or more traits of the user;
creating a first advisor avatar and a second advisor avatar that is visually distinct from the first advisor avatar, wherein a visual appearance of each of the first advisor avatar and second advisor avatar is based on a visual appearance of the user, at least one of the first advisor avatar and second advisor avatar being defined by an age progression modified version of the current visual appearance of the user;
identifying a financial goal of the user;
identifying one or more tasks related to the identified financial goal;
displaying, via a display of display device, the first advisor avatar; and
communicating, using the first advisor avatar displayed by the display device, the one or more tasks related to a user; and
communicating, using the second advisor avatar displayed by the display device, information related to the financial goal of the user;
wherein, in an observer mode, the first advisor avatar and second advisor avatar are displayed by the display device concurrently and the first advisor avatar communicates with the second advisor avatar to provide instructions to the user to complete the one or more tasks for achieving the financial goal without any direct involvement from the user, and wherein the visual appearance of the first advisor avatar and the second advisor avatar are modified in accordance with a first scenario in which the one or more tasks are completed, and wherein the visual appearance of the first advisor avatar and the second advisor avatar are modified in accordance with a second scenario in which the one or more tasks are not completed.

15. The method of claim 14, wherein the one or more traits of the user are obtained by the provider computing device from a source of user personal information that has been obtained through monitored usage of a computing device by the user.

16. The method of claim 14, further comprising associating the one or more tasks with one or more expected user behaviors, and subsequent to communicating the one or more tasks, monitoring the behavior of the user to determine whether the one or more tasks have been completed.

17. The method of claim 14, wherein each of the first advisor avatar and second advisor avatar are defined by an age progression modified version of the current visual appearance of the user, the first advisor avatar and second advisor avatar being visually distinct from one another.

18. The method of claim 14, wherein the other of the first advisor avatar and second advisor avatar is defined by a prior visual appearance of the user that is visually distinct from a current visual appearance of the user.

19. The method of claim 14, wherein the other of the first advisor avatar and second advisor avatar is defined by a current visual appearance of the user.

20. The method of claim 14, wherein both the first advisor avatar and second advisor avatar are concurrently displayed during at least one of communicating using the first advisor avatar and communicating using the second advisor avatar.

21. The method of claim 14, wherein the display device is defined by a plurality of segmented panels, the first advisor avatar being displayed in a first panel of the display device concurrently with the display of the second advisor avatar in a second panel of the display device.

22. The method of claim 21, wherein a third panel of the display comprises a mirror.

23. A non-transitory computer-readable medium having processor-readable instructions stored thereon such that, when executed by a processor, cause the processor to:
obtain personal information related to a user;
analyze the personal information to identify one or more traits of the user;
create a first baseline virtual coach and a second baseline virtual coach that is visually distinct from the first baseline virtual coach, wherein each of the first baseline virtual coach and the second baseline virtual coach are defined by one or more coach features selected based on at least one identified trait of the user;
transmit a graphical user interface to be displayed by a mobile application on a user device on which the mobile application is stored, the graphical user interface including one or more user selectable options allowing a user to select one or more features that are to define a first user-specific virtual coach based on the first baseline virtual coach, and a second user-specific virtual coach based on the second baseline virtual coach;
receive one or more selections input by the user via the graphical user interface;
create the first user-specific virtual coach based on features of the first baseline virtual coach and the feature selections received from the user;
create the second user-specific virtual coach based on features of the second baseline virtual coach and the feature selections received from the user, wherein at least one of the first user-specific virtual coach and the second user-specific virtual coach are defined by an age progression modified version of the current visual appearance of the user;
identify a financial goal of the user;
generate a first communication and a second communication to the user, each of the first communication and second communication containing information related to the financial goal of the user;
send the first communication to a display device to be presented by the first user-specific virtual coach; and
send the second communication to the display device to be presented by the second user-specific virtual coach;
wherein, in an observer mode, the first user-specific virtual coach and second user-specific virtual coach are displayed by the display device concurrently and the first user-specific virtual coach communicates with the second user-specific virtual coach to provide instructions to the user to complete the one or more tasks for achieving the financial coal without any direct involvement from the user, and wherein the visual appearance of the first user-specific virtual coach and the second user-specific virtual coach are modified in accordance with a first scenario in which the one or more tasks are completed, and wherein the visual appearance of the first user-specific virtual coach and the second user-specific virtual coach are modified in accordance with a second scenario in which the one or more tasks are not completed.

24. The medium of claim 23, wherein the one or m ore traits of the user are obtained from a source of user personal information that has been obtained through monitored usage of a computing device by the user.

25. The medium of claim 23, further comprising processor-readable instructions stored thereon that, when executed by a processor, cause the processor to present the second communication from the second user-specific virtual coach via the display device prior to or concurrent with communicating one or more tasks to the user using the first user-specific virtual coach.

26. The medium of claim 25, further comprising processor-readable instructions stored thereon that, when executed by a processor, cause the processor to associate the one or more tasks with one or more expected user behaviors, and subsequent to communicating the one or more tasks, monitor the behavior of the user to determine whether the one or more tasks have been completed.

27. The medium of claim 23, further comprising processor-readable instructions stored thereon that, when executed by a processor, cause the processor to display second user-specific virtual coach concurrently during the presenting of the first communication using the first user-specific virtual coach.

28. The medium of claim 23, wherein the display device is defined by a plurality of segmented panels, the medium further comprising processor-readable instructions stored thereon that, when executed by a processor, cause the processor to display the first user-specific virtual coach in a first panel of the display device concurrently with the display of the second user-specific virtual coach in a second panel of the display device.

* * * * *